(12) United States Patent
Gottschling et al.

(10) Patent No.: US 7,997,722 B2
(45) Date of Patent: Aug. 16, 2011

(54) SPECTACLE FRAME COMPRISING A JOINT FOR BENDING THE SPECTACLE BOWS

(75) Inventors: Harald Gottschling, Berlin (DE); Philipp Haffmans, Berlin (DE); Daniel Haffmans, Berlin (DE); Moritz Krueger, Berlin (DE)

(73) Assignee: Mykita GmbH, Berlin (DE)

( * ) Notice: Subject to any disclaimer, the term of this patent is extended or adjusted under 35 U.S.C. 154(b) by 22 days.

(21) Appl. No.: 11/628,069

(22) PCT Filed: May 4, 2005

(86) PCT No.: PCT/DE2005/000867
§ 371 (c)(1),
(2), (4) Date: Oct. 15, 2007

(87) PCT Pub. No.: WO2005/116727
PCT Pub. Date: Dec. 8, 2005

(65) Prior Publication Data
US 2008/0278677 A1    Nov. 13, 2008

(30) Foreign Application Priority Data
May 28, 2004   (DE) .......................... 10 2004 027 013

(51) Int. Cl.
*G02C 5/22* (2006.01)

(52) U.S. Cl. ............................ 351/153; 351/113; 16/228
(58) Field of Classification Search .................. 351/153, 351/113, 114, 116, 119, 111, 63, 41; 16/228
See application file for complete search history.

(56) References Cited

U.S. PATENT DOCUMENTS

| | | | | |
|---|---|---|---|---|
| 3,744,887 A * | 7/1973 | Dunbar | ......................... | 351/153 |
| 4,377,328 A * | 3/1983 | Ferrandi | ....................... | 351/126 |
| 4,826,309 A * | 5/1989 | VanNeste | ....................... | 351/114 |
| 4,963,013 A * | 10/1990 | Bononi | ......................... | 351/114 |
| 5,367,344 A | 11/1994 | Fuchs | | |
| 6,145,985 A * | 11/2000 | De Marchi et al. | ........... | 351/153 |
| 7,344,242 B2 * | 3/2008 | Habermann | .................. | 351/156 |
| 2004/0032564 A1 | 2/2004 | Meiler | | |

OTHER PUBLICATIONS

Patent Abstracts of Japan Publication No. 10039261, vol. 1998, No. 6, Apr. 30, 1998.

* cited by examiner

*Primary Examiner* — Hung X Dang
(74) *Attorney, Agent, or Firm* — Kriegsman & Kriegsman

(57) ABSTRACT

An eyeglass frame with a hinge for angling the eyeglass temples, for which, in the middle of the hinge surface, the hinge has excess material, which, depending on the position of the excess material, leads to a bending of the hinge or holds the hinge in one plane.

15 Claims, 9 Drawing Sheets

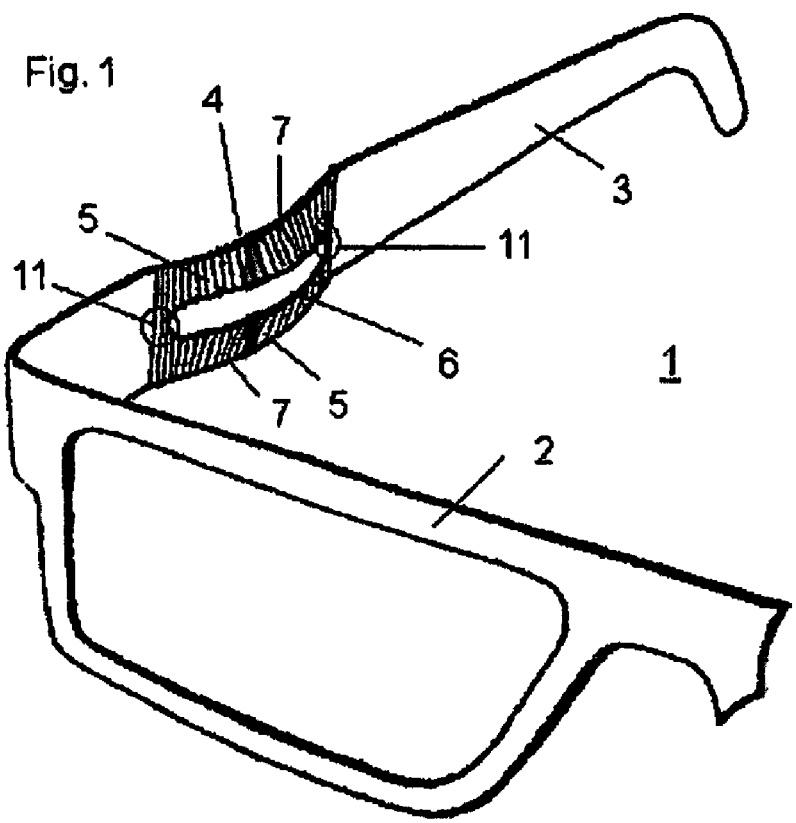
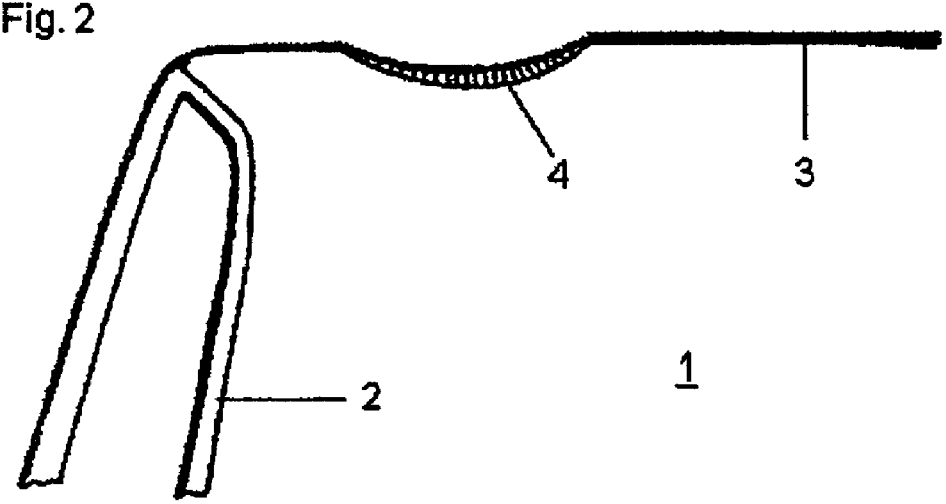

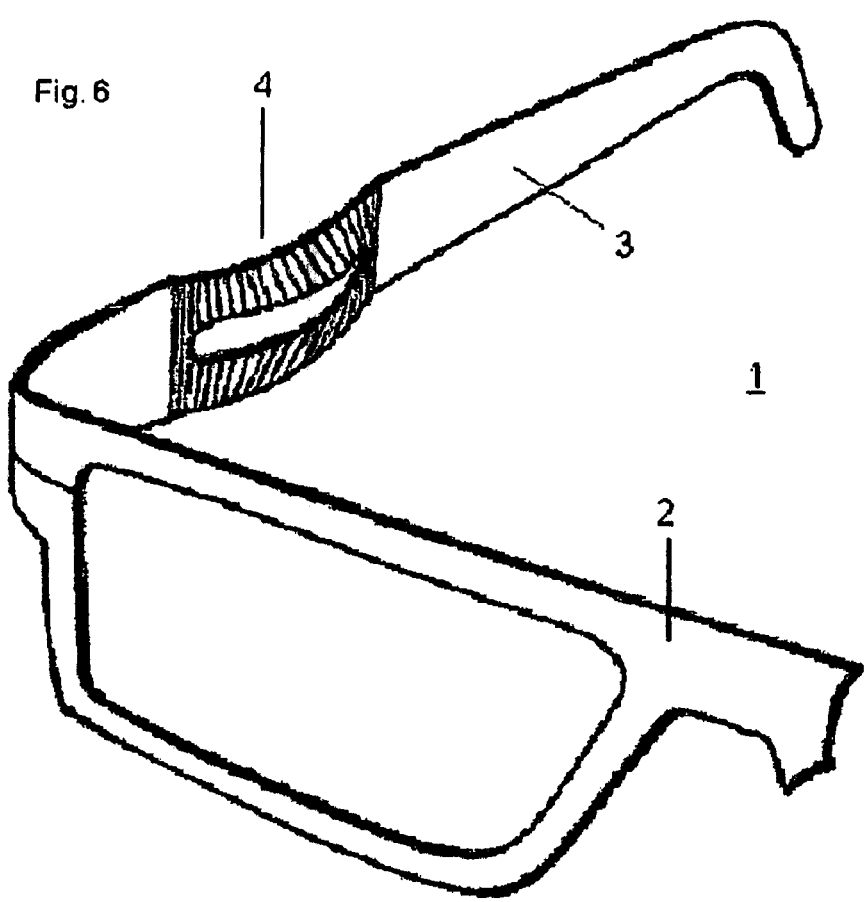

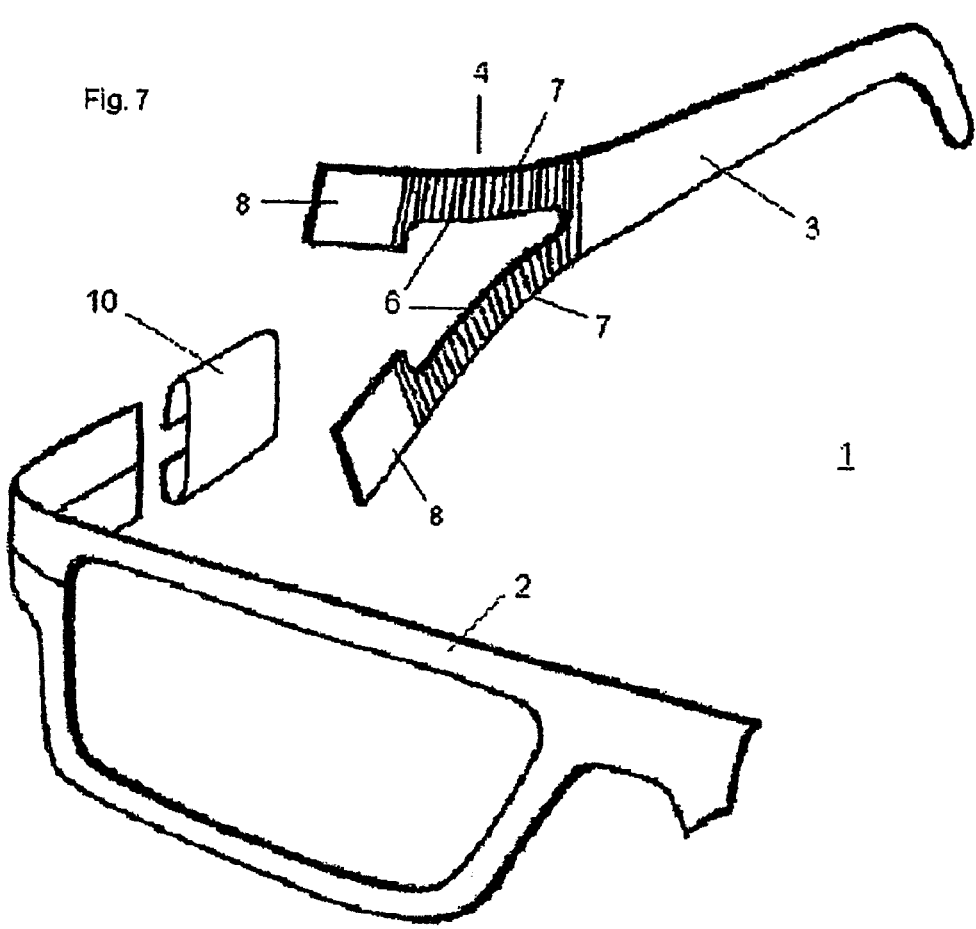

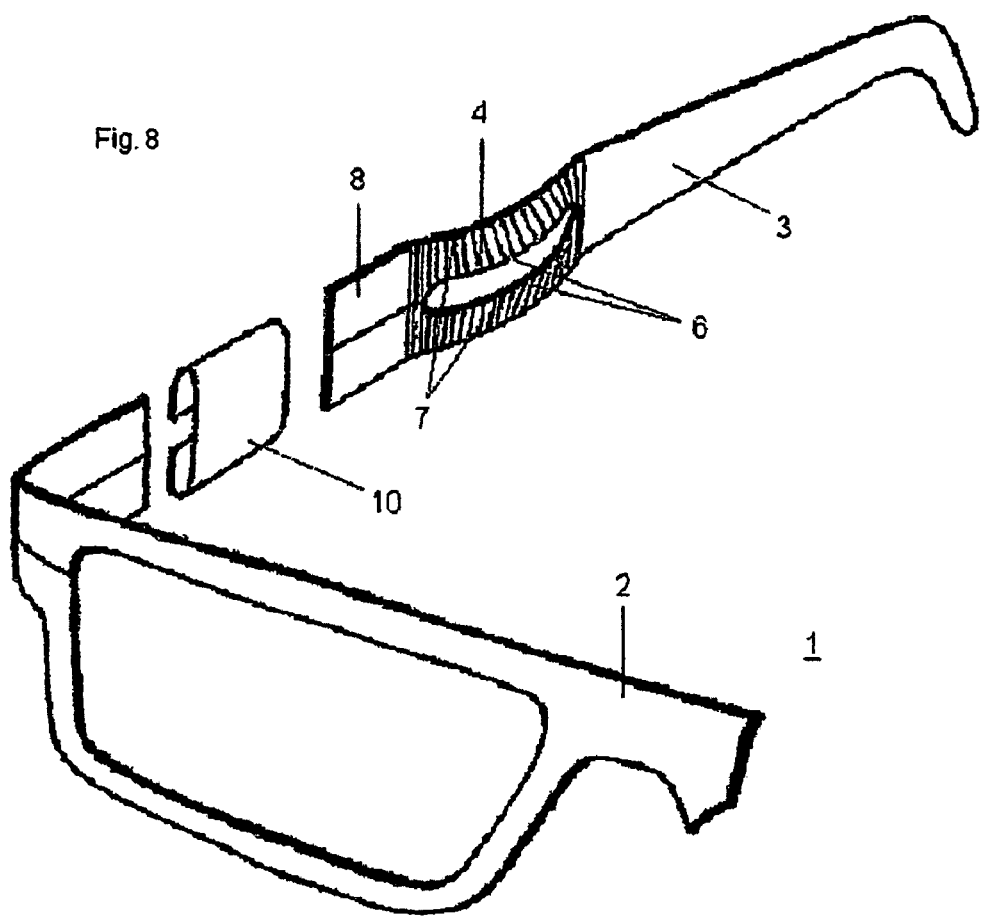

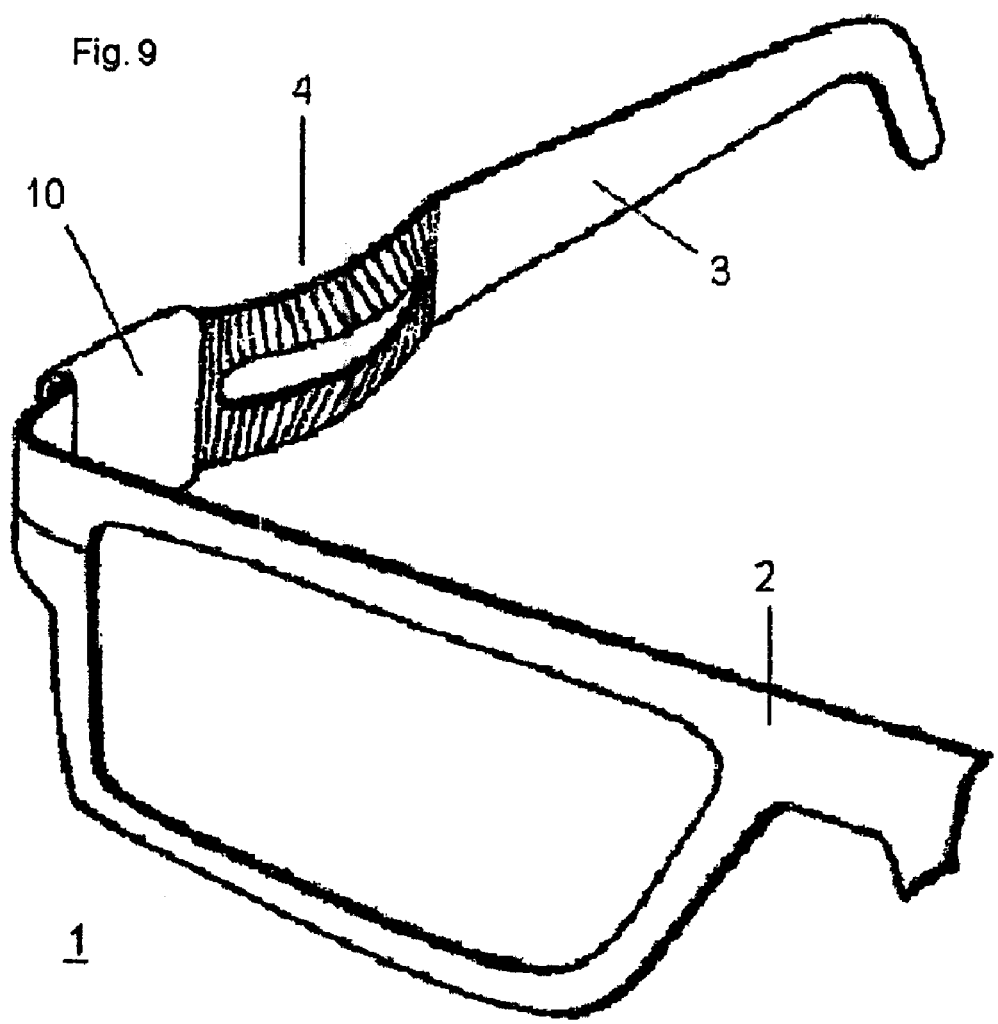

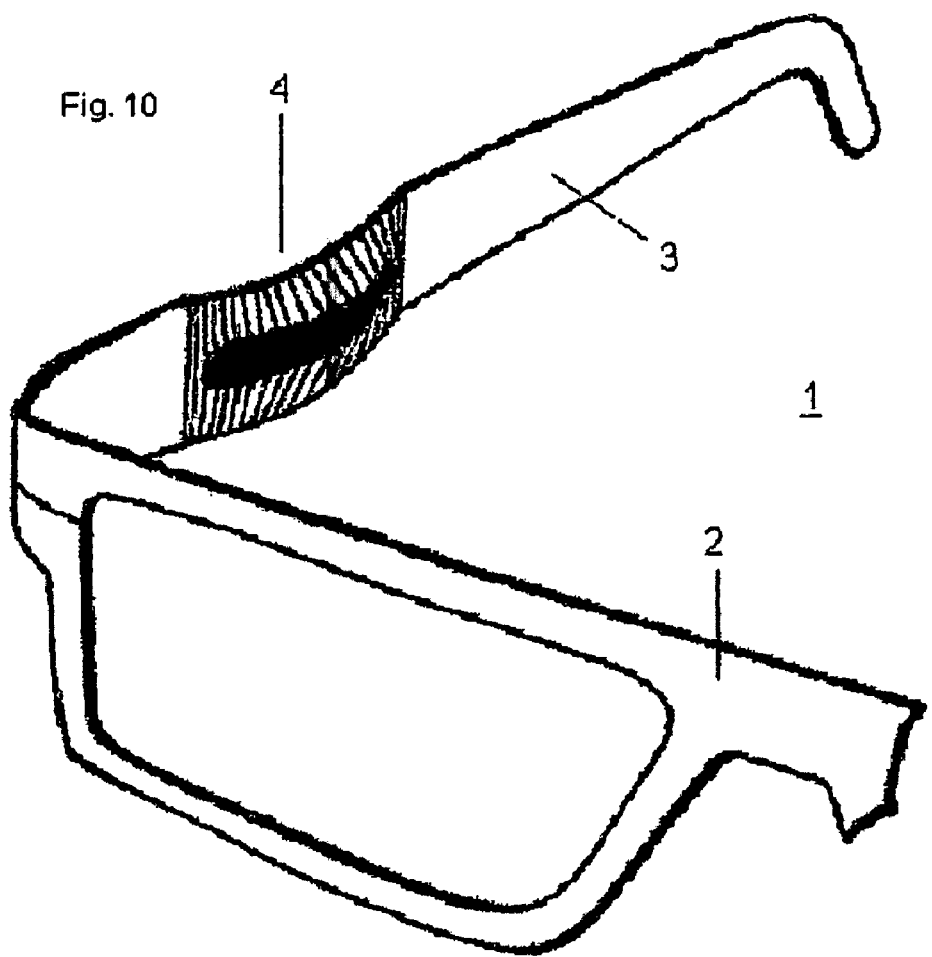

SPECTACLE FRAME COMPRISING A JOINT FOR BENDING THE SPECTACLE BOWS

BACKGROUND OF THE INVENTION

The invention relates to an eyeglass frame with a hinge for bending of the eyeglass temples as well as a process for the production thereof.

The invention further relates to a use of snap springs with a "snap frog" effect.

Eyeglasses belong to the prior art and are known in many embodiments. Most eyeglasses are equipped with a hinge, one part of which is linked to the eyeglass rim and the other part of which is linked to the eyeglass temple. The two parts are inserted into each other and screwed together.

Described in U.S. Pat. No. 4,898,460 are eyeglasses in which the eyeglass frame consists of a tube, which, at several points, has hinge bellows at which the tube can be bent to a shape that is adapted to the person wearing the eyeglasses.

Further described in JP 10-039 261 A is an eyeglass frame for which the flexible eyeglass temples are held in an unfolded position by a spring mechanism.

SUMMARY OF THE INVENTION

The problem of the invention is to provide easy-to-produce, screwless eyeglasses with a hinge for bending of the eyeglass temples.

The problem is solved by an eyeglass frame for which, in the middle of the hinge surface, the hinge has excess material, which, depending on the position of the excess material, leads to a bending of the hinge or holds the hinge in one plane.

The hinge is so constructed that it forms a flat surface, which is angled at approximately a right angle from the frontal eyeglass rim. In this position of maximum temple contact angle, the excess material is on the face side of the plane that is formed by the hinge surface. If the eyeglass temple is then folded in, so that the temple contact angle is reduced, the excess material moves in the direction of the plane and thus leads to a locking of the eyeglass temple in a position having a smaller temple contact angle. This abrupt flipping of the eyeglass temple corresponds to the "snap frog effect."

As is the case for the sheet-metal snap frogs commonly used at Fasching [Shrovetide carnival], the pressure may be increased for a long time up to a certain point at which the sheet metal springs into a second position. A similar mechanism is also commonly used for some hair clips.

At one end, the eyeglass temple preferably has a surface having excess material on one side of the surface. This excess material forms the hinge of the eyeglasses.

The hinge of the eyeglass frame is based on a mechanism similar to that of the "snap frog effect." Here, a snap spring is integrated (or pressed in) between the frontal eyeglass frame and the eyeglass temple in such a way that the frontal eyeglass frame and the eyeglass temple form nearly a right angle. If the eyeglass temple is then bent in the direction of the frontal eyeglass frame, it flips over at a certain point and remains in this folded-in position. When the eyeglass temple is unfolded, a certain resistance must first be surmounted as well. However, once a certain point has been reached, the eyeglass temple unfolds completely and remains in this unfolded position.

In a preferred embodiment of the invention, the eyeglass frame is fabricated in one piece. This has the advantage that the entire eyeglass frame can be produced from a sheet metal or a carbon plate, which can be fabricated by punching, etching, eroding, or stamping of the hinge.

In another preferred embodiment of the invention, the eyeglass temple can be removed. This has the advantage that the eyeglasses can be disassembled very flatly for transport. Also possible in this way is the exchange of various frontal eyeglass rims or various eyeglass temples. Thus, it is possible to respond quickly to changes in fashion or corrective lenses may be exchanged for tinted lenses. In particular for corrective lenses, it is important here that the frontal eyeglass rim can be opened in such a way that the eyeglass lenses can be easily exchanged. However, it is also possible to produce the eyeglass rim in a closed variant. In this case, the lenses are pressed into the eyeglass rim. The eyeglass temple consists preferably of a flat strip, which, at one end, separates into two strips that are angled apart from each other, the two angled strips being rejoined at their ends.

When the two angled strips are rejoined, the inner side in each case is longer than the outer side and thus excess material is created, which, on being deformed by pressure, leads to the "snap frog effect."

Preferably, the strips that are angled from each other have, on their inner sides, mechanisms by means of which they can be joined to each other. Here, it is possible to use the most diverse mechanisms in order to join the two ends of the angled strips back together. Possible are hooks that enable the two ends to hook into each other. However, it is also possible to screw them together, to rivet them together, to weld them together, to glue them together, or to join them together with a snap fastener.

Preferably, the mechanism prevents a displacement of the ends of the angled strips in two spatial directions. To this end, the angled strips have mechanisms that mutually engage and can be opened in only one spatial direction. A displacement in this spatial direction can then be prevented, as described above, by a connecting clip.

Preferably, the mechanism is a dovetail-like linkage. This has the advantage that the linkage can be kept very flat.

A connecting clip can also be slipped over the two ends to secure the linkage and, in addition, makes possible the linking to the frontal eyeglass rim.

In order to enable the eyeglass frame to be folded over at a specific point, the hinge of the eyeglass frame must be made of a material that is inherently stable, but has a certain flexibility and resists certain stresses in the material. Therefore, the eyeglass frame is preferably made of metal, paper, cardboard, carbon fiber, and/or plastic.

Furthermore, the problem of the invention is solved by a process for producing an eyeglass frame, in which, in a first step, the eyeglass frame is punched out, laser-cut, eroded out, or etched out of a flat material, and, in a second step, is deformed through the application of point pressure in such a way that a hinge is formed. Fabricated in this way from plates are blanks, which, then, are deformed under pressure to afford the desired eyeglass frame. In this way, it is possible to cut out the most diverse forms of eyeglass frames.

In a preferred embodiment of the invention, metal or plastic is selected as the flat material. However, it is also possible to use other materials, such as, for example, paper, cardboard, or carbon fiber. In principle, any material that has the necessary flexibility for deformation of the hinge may be used. The use of metal or plastics has the advantage that these materials can be deformed under pressure. The hinge of the eyeglass frame is formed (surface-embedded) through point pressure. To this end, point pressure is applied to the material at a defined site of the eyeglass temple. At this site, the material is flattened and thus displaces the adjoining material, as a result of which the parallel-lying sheet-metal strips on the upper and lower parts of the temple are spread apart. This occurs at two opposite-lying sites, as a result of which a bulging protuberance (excess material) is formed in the middle of the strips. The inner side of the hinge is thereby pressed more strongly out of the plane of the hinge than the outer side, so that excess material forms in the middle of the hinge surface. A movement of the excess material through the plane of the hinge leads, then, to the transfer of the excess material from one plane of the hinge to the other and accordingly to a change in the angle between the eyeglass temple and the eyeglass rim.

Preferably used is a flat material with a thickness of 0.1 to 5 mm and, especially preferably, of 0.4 to 0.8 mm. In this way, it is possible to produce a stable eyeglass frame, which nonetheless makes possible deformations at the hinge. However, it is also possible to make the flat material thicker in the region of the eyeglass rim in order to achieve a higher strength and to make the material thinner in the region from which the hinge is formed in order to achieve a greater flexibility.

In another preferred embodiment of the invention, the surface of the eyeglass frame is coated, lacquered, etched, and/or engraved in a further operating step. In this way, it is possible, for example, by means of an electroplating or a lacquering, to protect the eyeglass frame from corrosion or to modify it optically.

In a further operating step, preferably plastic, silicone, horn, or rubber pads are placed on the eyeglass bridge and/or at the ends of the eyeglass temples. This enables the eyeglasses, when they are worn, to be supported without any friction or pressure and thus increases the wearing comfort.

Furthermore, the problem of the present invention is solved by a use of snap springs with "snap frog effect" as a hinge of an eyeglass frame.

BRIEF DESCRIPTION OF THE DRAWINGS

The invention will be described below in more detail on the basis of drawings. Shown individually are:

FIG. 1 a cutout of the eyeglass frame with unfolded eyeglass temple;

FIG. 2 another cutout of the eyeglass frame with unfolded eyeglass temple;

FIG. 6 a cutout of an eyeglass frame, which consists of one part;

FIG. 7 a cutout of an eyeglass frame with angled strips;

FIG. 8 a cutout of an eyeglass frame in which the ends of the angled strips are pressed together;

FIG. 9 a cutout of an eyeglass frame made of several parts and with open eyeglass temple;

FIG. 10 a cutout of an eyeglass frame having a hinge made of one surface; and

DETAILED DESCRIPTION OF THE INVENTION

Figure 3:
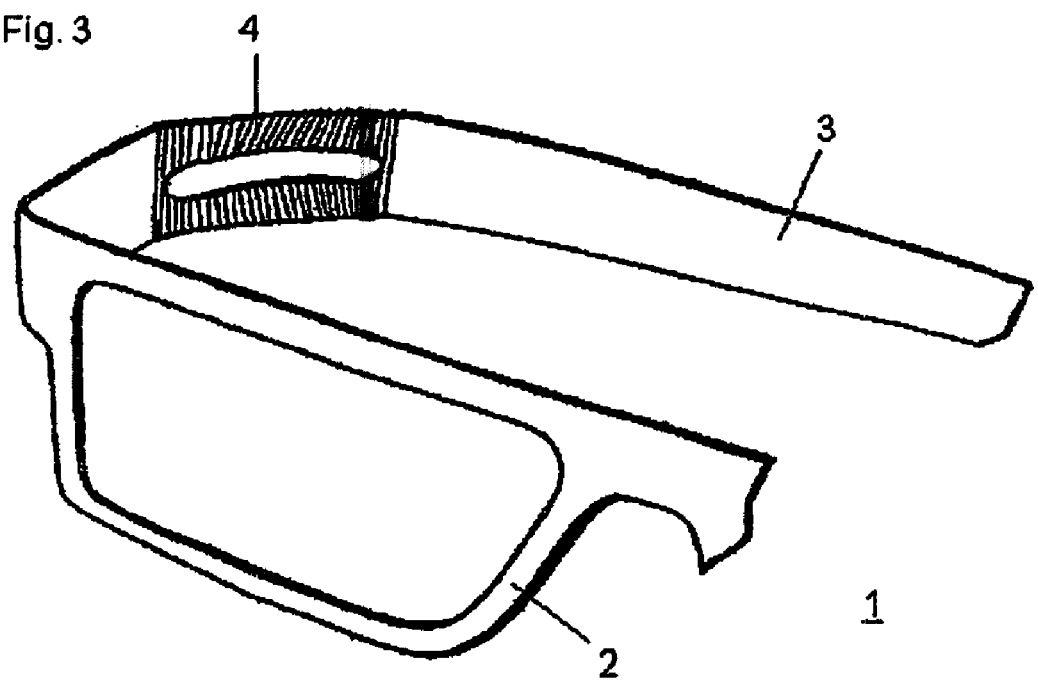
FIG. 3 a cutout of the eyeglass frame with folded-in eyeglass temple.

FIG. 1 and FIG. 2 show a cutout of the eyeglass frame 1. The eyeglass frame 1 consists of the frontal eyeglass rim 2, the eyeglass temple 3, and the hinge 4. The hinge 4 consists of two strips 5, by means of which the eyeglass temples 3 are linked to the frontal eyeglass rim 2.

The strips 5 are longer on their inner side 6 than on their outer side 7, so that they bend out of the plane formed by the eyeglass temple 3 (excess material). The excess material is produced here by point pressure on the deformation point 11.

Figure 4:
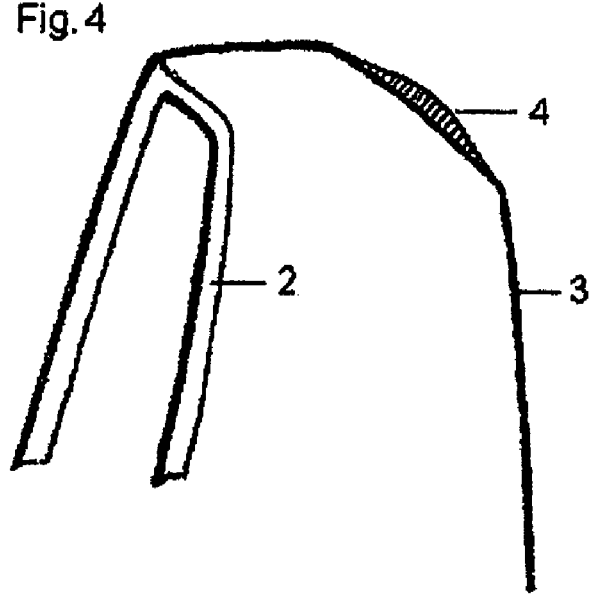
FIG. 4 a cutout of the eyeglass frame with folded-in eyeglass temple.

If the eyeglass temples 3 are pressed in the direction of the frontal eyeglass rim 2, then the excess material on the longer inner side 6 is pressed to the other side of the eyeglass temple 3. This is depicted in FIGS. 3 and 4. FIGS. 3 and 4 show the eyeglass temple 1 in a folded-in position.

Figure 5A:
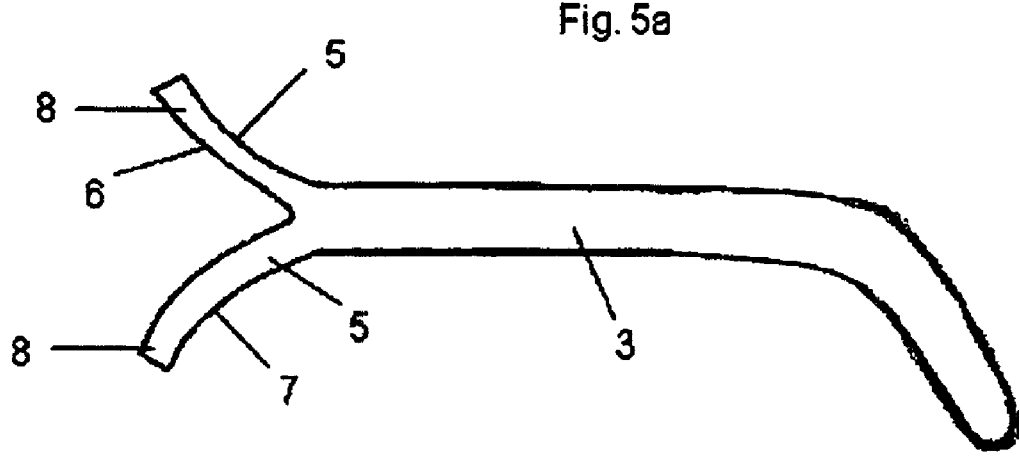
FIG. 5a an eyeglass temple.

FIG. 5a shows an eyeglass temple 3 and the hinge 4. The hinge 4 consists of two strips 5, which extend at an angle from the eyeglass temple 3. Owing to the bending of the strips 5, their inner side 6 is longer than their outer side 7.

Figure 5B:
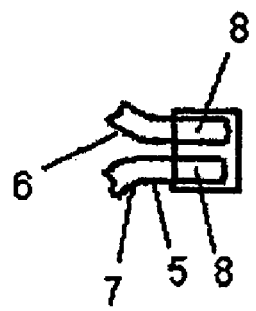
FIG. 5b the linkage site of the two ends of the eyeglass temple.

If the two strips 5 are fastened together at their ends 8, as depicted in FIG. 5b, there is formed a tension in the strips 5. As a result of this tension, the inner sides 6 of the strips 5 are pressed out of the plane formed by the eyeglass temple 3. The excess material, which is formed by the inner sides 6 of the strips 5, is accordingly pressed out of the plane formed by the eyeglass temple 3. If the eyeglass temple 3 is bent as depicted in FIGS. 1 and 2, the excess material is located on the one side of the eyeglass temple 3 and if the eyeglass temples 3 are folded together, as depicted in FIGS. 3 and 4, then the excess material moves to other side of the eyeglass temple 3.

FIG. 6 shows another embodiment of the present invention, in which the eyeglass frame 1 is fabricated from one piece. Here, the hinge 4 is produced by pressing or stamping, by pressing the inner side 6 out of the plane.

FIG. 7 shows a cutout of the eyeglass frame 1 according to the present invention in an exploded drawing. In this embodiment, the frontal eyeglass rim 2 is linked to the eyeglass temple 3 by a connecting clip 10. One end of the eyeglass temple 3 is a hinge 4, which is formed by two oppositely angled strips 5, whose inner side 6 is longer than their outer side 7.

The inner side 6 and the outer side 7 are pressed together at their ends 8 by a connecting clip 10. The connecting clip 10 is designed in such a way that it enables a secure linking between the ends 8 and the frontal eyeglass rim 2.

FIG. 8 shows the same embodiment as FIG. 7, but, here, the ends 8 of the angled strips 5 are depicted in a pressed-together position. Owing to the longer inner side 6 of the angled strips 5, excess material, which is pressed out, is thus formed.

FIG. 9 shows the embodiment depicted in FIGS. 7 and 8 in a mounted form. Here, the hinge 4 is arched in one direction owing to the excess material.

FIG. 10 shows another embodiment of the present invention, in which the hinge 4 does not have a hole, but rather consists of a surface in which excess material has been shaped.

FIGS. 11a to 11n show a selection of various possible embodiments of the eyeglass temple 3. The eyeglass temples 3 each have differently shaped, oppositely angled strips 5, which form the hinge 4. In addition, the angled strips 5 have, on their inner side 6, a mechanism 9 by means of which they can be joined together.

Figure 11:
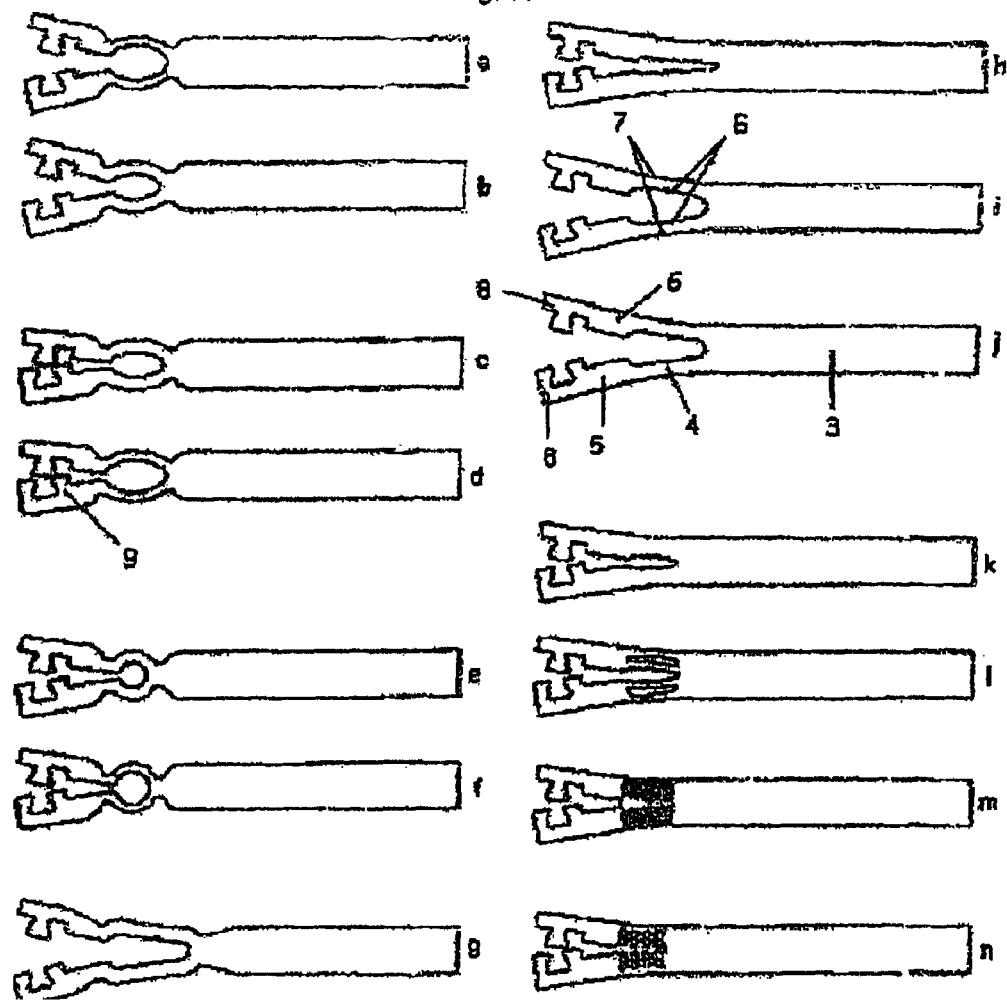
FIGS. 11a to 11n various eyeglass temples having a hinge and a dovetail linkage.

In FIG. 11, the ends 8 of the angled strips 5 take the form of a dovetail linkage. However, other mechanisms 9 for linking the two angled strips 5 are also possible.

In FIG. 11m, the inner side 6 has a looped shape, which means a longer length of the inner side 6 in comparison to the outer side 7.

LIST OF REFERENCE NUMERALS 1 eyeglass frame
2 eyeglass rim 3 eyeglass temple
4 hinge
5 angled strip
6 inner side
7 outer side
8 end
9 mechanism
10 connecting clip
11 deformation point

The invention claimed is:

1. An eyeglass frame comprising an eyeglass rim and a pair of eyeglass temples, each of the eyeglass temples being coupled to the eyeglass rim by a hinge, said hinge comprising a snap spring that abruptly flips, upon application of sufficient pressure, from one shape to another shape, whereby operation of said snap spring enables the corresponding eyeglass temple to be reversibly and lockably switched between an open position at approximately a right angle relative to the eyeglass rim and a folded position relative to the eyeglass rim.

2. The eyeglass frame according to claim 1, wherein the eyeglass frame is fabricated from one piece.

3. The eyeglass frame according to claim 1, wherein at least one eyeglass temple is designed to be removable from the eyeglass rim.

4. The eyeglass frame according to claim 3, wherein the eyeglass temple and at least a portion of the hinge are integrally formed, the eyeglass temple consisting of a flat strip, which is divided at one end into two oppositely angled strips, the two angled strips being rejoined at their ends.

5. The eyeglass frame according to claim 3, wherein the oppositely angled strips have, on their inner sides, mechanisms by means of which they can be joined to each other.

6. The eyeglass frame according to claim 3, wherein the mechanism prevents a displacement of the ends of the angled strips in two spatial directions.

7. The eyeglass frame according to claim 3, wherein the mechanism is a dovetail-like linkage.

8. The eyeglass frame according to claim 1, wherein it is made of at least one of metal, paper, cardboard, carbon fiber, and plastic.

9. A process for the production of an eyeglass frame comprising an eyeglass rim and a pair of eyeglass temples, each of the eyeglass temples being coupled to the eyeglass rim by a hinge, said hinge comprising a snap spring that abruptly flips, upon application of sufficient pressure, from one shape to another shape, whereby operation of said snap spring enables the corresponding eyeglass temple to be reversibly and lockably switched between an open position at approximately a right angle relative to the eyeglass rim and a folded position relative to the eyeglass rim, wherein, in a first step, the eyeglass frame is one of punched out, laser-cut, eroded out, and etched out of a flat material, and, in a second step, is deformed through the application of point pressure in such a way that said snap spring is formed.

10. The process according to claim 9, wherein, as flat material, metal or plastic is selected.

11. The process according to claim 9, wherein a flat material with a thickness of 0.5 to 5 mm is used.

12. The process according to claim 9, wherein a flat material with a thickness of 0.4 to 0.8 mm is used.

13. The process according to claim 9, further comprising the step of placing one of plastic, silicone, horn, and rubber pads on at least one of the eyeglass bridge and the end of the eyeglass temples.

14. The process as claimed in claim 9, further comprising the step of treating the surface of the eyeglass frame by at least one of coating, lacquering, etching and engraving.

15. A process for the production of an eyeglass frame comprising an eyeglass rim and a pair of eyeglass temples, each of the eyeglass temples being coupled to the eyeglass rim by a hinge, said hinge comprising a snap spring that abruptly flips, upon application of sufficient pressure, from one shape to another shape, whereby operation of said snap spring enables the corresponding eyeglass temple to be reversibly and lockably switched between an open position at approximately a right angle relative to the eyeglass rim and a folded position relative to the eyeglass rim, wherein in a first step the eyeglass temples consist of a flat strip which at one end thereof separates into two strips that are angled apart from each other and are joined together at said one end of each eyeglass temple in such a manner that the inner side is longer than the outer side, thereby forming the hinge, and in a second step the eyeglass temples are coupled to the eyeglass rim.

* * * * *